(12) United States Patent
Ktenas et al.

(10) Patent No.: US 8,155,230 B2
(45) Date of Patent: Apr. 10, 2012

(54) METHOD FOR THE FLEXIBLE DEMODULATION OF ESTIMATED COMPLEX SYMBOLS

(75) Inventors: Dimitri Ktenas, Fontaine (FR); Mathieu Bouvier Des Noes, Grenoble (FR); Julien Barletta, Grenoble (FR); Claire Guyon, La Tronche (FR)

(73) Assignee: Commissariat a l'Energie Atomique, Paris (FR)

( * ) Notice: Subject to any disclaimer, the term of this patent is extended or adjusted under 35 U.S.C. 154(b) by 1123 days.

(21) Appl. No.: 11/817,267

(22) PCT Filed: Mar. 8, 2005

(86) PCT No.: PCT/FR2005/050149
§ 371 (c)(1),
(2), (4) Date: Aug. 28, 2007

(87) PCT Pub. No.: WO2006/095061
PCT Pub. Date: Sep. 14, 2006

(65) Prior Publication Data
US 2008/0175339 A1 Jul. 24, 2008

(51) Int. Cl.
*H04B 7/02* (2006.01)
(52) U.S. Cl. ........ 375/267; 375/260; 375/341; 370/203; 370/208; 370/210; 370/335; 370/342
(58) Field of Classification Search .................. 375/267, 375/341, 260, 316, 340; 370/335, 342, 345, 370/347
See application file for complete search history.

(56) References Cited

OTHER PUBLICATIONS

Tosato, Filippo, Paolo Bisaglia. "Simplified soft-output demapper for binary interleaved COFDM with application to HIPERLAN/2," Communications, 2002. ICC 2002. IEEE International Conference on, vol. 2, pp. 664-668, 2002.*

Chaufray, Jean-Marie, Walid Hachem and Philippe Loubaton. "Asymptotic analysis of optimum and suboptimum CDMA downlink MMSE receivers," Information Theory, IEEE Transactions on, vol. 50, No. 11, pp. 2620-2638, Nov. 2004.*

(Continued)

*Primary Examiner* — Khanh C Tran
*Assistant Examiner* — Eboni Hughes
(74) *Attorney, Agent, or Firm* — Oblon, Spivak, McClelland, Maier & Neustadt, L.L.P.

(57) ABSTRACT

A method for soft demapping of complex-valued symbols y(k) (k=1, 2, ..., K) by calculation of a Logarithm of Likelihood Ratio (LogLR) such that:

$$\text{Log}LR(b_{I,q}) = \ln \frac{\sum_{\lambda \in S_{I,q}^{(1)}} \exp\left(-\frac{1}{2}\beta|\tilde{y}(k) - \lambda|^2\right)}{\sum_{\lambda \in S_{q,I}^{(0)}} \exp\left(-\frac{1}{2}\beta|\tilde{y}(k) - \lambda|^2\right)}$$

wherein bI,q is the $q^{th}$ coded bit of an in-phase part of a transmitted signal, β is an asymptotic Signal-to-Interference-plus-Noise Ratio, ỹ(k) is a standardized symbol associated with y(k), λ is a reference symbol of QAM constellation associated with a M-QAM modulation, $S^{(1)}$I,q and $S^{(0)}$I,q are complex plane partitions that bring together, respectively, all reference symbols λ having a "1" at the position (I, q) and all reference symbols λ having a "0" at the position (I, q), a formula similar to LogLR being given for the bit bQ,p, $p^{th}$ coded bit of a quadrature part of the transmitted signal. The method applies to code division multiple access transmission systems.

2 Claims, 4 Drawing Sheets

OTHER PUBLICATIONS

Hachem, Walid. "Simple polynomial detectors for CDMA downlink transmissions on frequency-selective channels," Information Theory, IEEE Transactions on, vol. 50, No. 1, pp. 164-171, Jan. 2004.*

Jallon, Pierre, M. des Noes, D. Ktenas and Jean-Marc Brossier. "Asymptotic analysis of the multiuser MMSE receiver for the downlink of a MC-CDMA system," Vehicular Technology Conference, 2003. VTC 2003-Spring. The 57th IEEE Semiannual, vol. 1, No., pp. 363-367 vol. 1, Apr. 22-25, 2003.*

S. Kaiser, "OFDM Code-Division Multiplexing in Fading Channels", IEEE Transactions of Communications, XP001125116, vol. 50, No. 8, Aug. 2002, pp. 1266-1273.

P. Loubaton, "Asymptotic Distribution of Large Random Matrices and Performance Analysis of Large CDMA Systems", Proceedings Seventh International Symposium on Signal Processing and Its Applications, XP010653339, vol. 2, Jul. 1, 2003, pp. 205-214.

M. Debbah, "Linear Precoders for OFDM Wireless Transmission" http://www.eurecom.Fr/%7edebbah/papier/phd-thesis-debbah.pdf, XP002311552, Oct. 2002, 162 pages.

W. Hachem, "Simple Polynomial Detectors for CDMA Downlink Transmissions on Frequency-Selective Channels" IEEE Transactions on Information Theory, XP002311548, vol. 50, No. 1, Jan. 2004, pp. 164-171.

J. M. Chaufray, et al. "Asymptotic Analysis of Optimum and Sub-Optimum CDMA MMSE Receivers, "Proceedings IEEE International Symposium on Information Theory, XP002311549, Jun. 30 and Jul. 5, 2002, p. 189.

P. Jallon, et al., "Asymptotic analysis of the Multiuser MMSE Receiver for the downlink of a MC-CDMA System", The $57^{th}$ IEEE Semiannual Vehicular Technology Conference, XP002311550, vol. 1, Apr. 2003, pp. 363-367.

F. Tosato, et al., "Simplified Soft-Output Demapper for Binary Interleaved COFDM with Application to HIPERLAN/2", IEEE International Conference on Communications, XP002311551, vol. 2, Apr. 28, 2002, pp. 664-668.

Chaufray, et al., "Asymptotic Analysis of Optimum and Suboptimum CDMA Downlink MMSE Receivers", IEEE Transactions on Information Theory, vol. 50, No. 11, pp. 2620-2638, XP002352409, 2004.

Tosato, et al., "Simplified Soft-Output Demapper for Binary Interleaved COFDM with Application to HIPERLAN/2", IEEE International Conference on Communications, vol. 1 of 5, pp. 664-668, XP010589578, 2002.

Kaiser, "OFDM Code-Division Multiplexing in Fading Channels", IEEE Transactions on Communications, vol. 50, No. 8, pp. 1266-1273, XP-001125116, 2002.

* cited by examiner

METHOD FOR THE FLEXIBLE DEMODULATION OF ESTIMATED COMPLEX SYMBOLS

TECHNICAL FIELD AND PRIOR ART

The present invention relates to a method for the soft demapping of complex-valued symbols and a method for decoding complex-valued symbols that includes soft demapping according to the invention.

The invention finds an application in transmission systems that implement the technique known as "Code Division Multiple Access" (CDMA).

Complex-valued symbols are data which is processed in CDMA receivers. They equate to complex symbols transmitted by CDMA transmitters and constituted by binary data coded by convolutional coding and quadrature modulated according to a M-QAM modulation, where M is an integer equal to $2^m$, and m is an integer greater than or equal to 1.

Convolutional coding associates a block of B coded bits with a block of A information bits (B>A), the B coded bits being a function of the A information bits and of the state of the coder.

A known convolutional coding structure is the trellis structure. The trellis is formed of a group of nodes connected by branches. The nodes represent the different states of the coder and the branches represent the different possible transitions from one node to the next. A trellis includes $2^v$ nodes, where v is the coder memory which is equal to the code constraint length reduced by 1.

An algorithm commonly used for decoding binary data coded by convolutional coding is the Viterbi algorithm. Decoding then consists in searching, in the trellis, for the path which corresponds to the most probable sequence, i.e. the sequence which is the minimum distance away from the received sequence. The Viterbi algorithm thereby allows a sequence of bits transmitted to be relocated from a complete sequence of bits received.

One advantage of the Viterbi algorithm is the use of soft or metric values at the decoder input. Soft value is to be taken to mean a value which is not a hard binary value such as a "0" or a "1". The optimum metrics to be provided at the Viterbi decoder input is thus given by the Logarithm of the Likelihood Ratio noted LogLR.

The LogLR measures the probability that a decoder input bit is, after demodulation, a "0" or a "1". Where Quadrature Amplitude Modulation (QAM) is involved, the LogLR is a soft value associated with each of the bits of a QAM complex symbol, and is so independently for the bits of one and the same QAM received symbol. The signal received is then demodulated into a soft bit whereof the sign corresponds to the bit supplied by a hard decision detector and whereof the absolute value indicates the reliability of the quadrature demodulation module decision.

Figure 1:
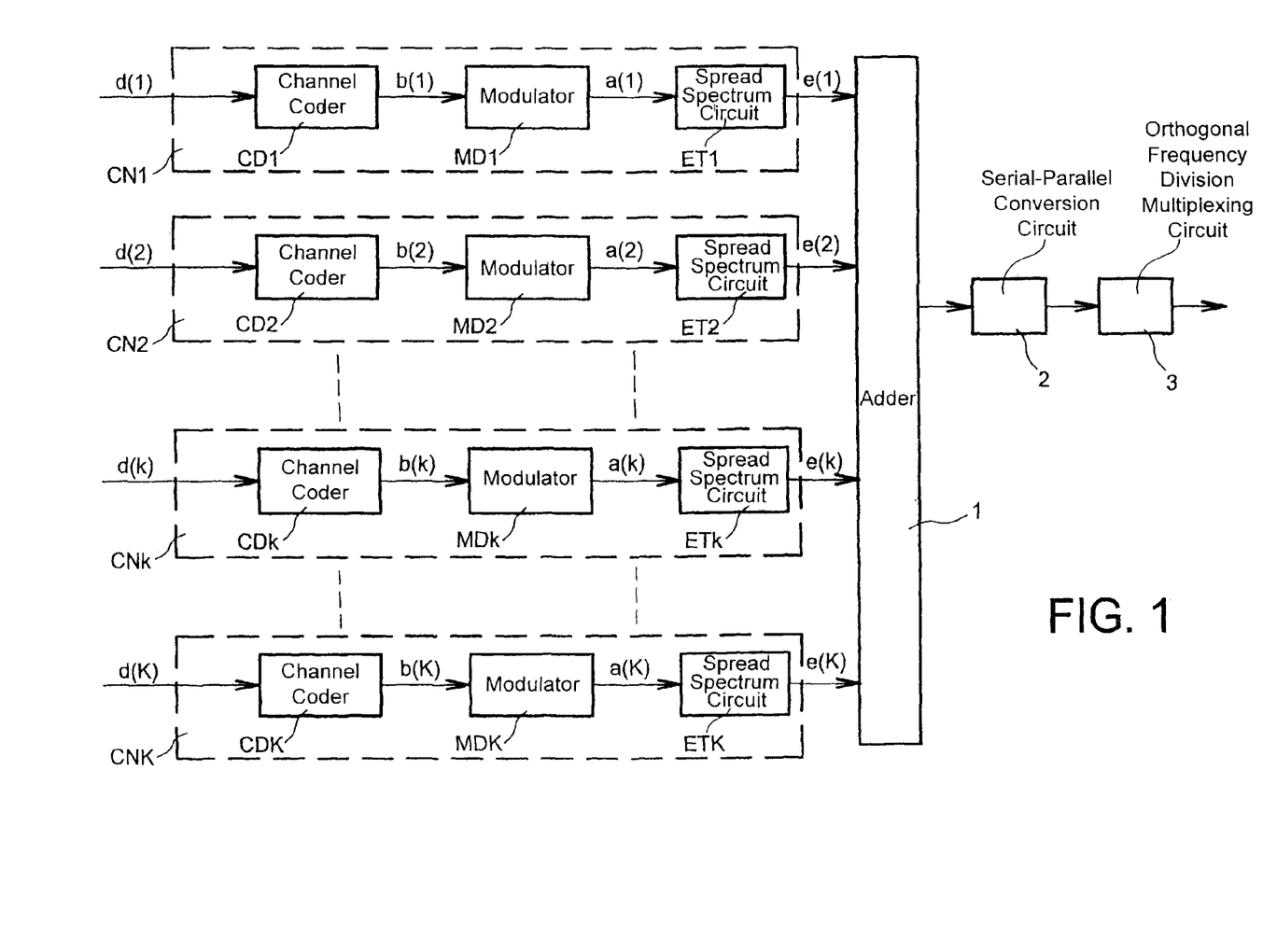
FIG. 1 shows an MC-CDMA transmitter with convolutional coding according to the prior art.

A multi-carrier CDMA transmitter according to the prior art, also known as an MC-CDMA transmitter (MC-CDMA standing for "Multi-Carrier Code Division Multiple Access") is shown in FIG. 1.

The MC-CDMA transmitter includes K user channels CNk (k=1, 2, ..., K), an adder 1, a serial-parallel conversion circuit 2 and an orthogonal frequency division multiplexing circuit 3.

The channel CNk associated with the user of rank k (k=1, 2, ..., K) includes a channel coder CDk, a modulator MDk and a spread-spectrum circuit ETk. The channel coder CDk includes a convolutional coder, a spot punch and a bit interleaving circuit mounted in series. The spot punch allows the required coding efficiency to be obtained for the application and the bit interleaving circuit prevents error bursts at reception.

A succession of information bit streams d(k) are applied to the input of the channel coder CDk. The data of a bit stream d(k) is then coded and the channel coder CDk delivers an coded bit stream b(k) which is transmitted to the modulator MDk. The modulator MDk delivers a complex M-QAM symbol a(k), with M equating to the number of states of the complex symbol a(k).

As is known to the man skilled in the art, the M states of the complex symbol a(k) may be represented by a constellation of M points in the complex plane (I, Q), the axis I being an in-phase signal axis and the axis Q a quadrature signal. The transmitted complex symbol a(k) is written:

$$a(k)=a_I(k)+j\,a_Q(k)$$

where $a_I(k)$ and $a_Q(k)$ are the components of a (k), along the axis I and along the axis Q respectively.

In the case, for example, where $M=2^{2m}$, the constellation, or group of states in the complex plane (I, Q), is a square QAM constellation for which the coded binary sequence b (k) is written:

(bI,1, ..., bI,q, ..., bI,m; bQ,1, ..., bQ,p, ..., bQ,m), where the coded bit bI,q is the $q^{th}$ bit of the in-phase part of the signal (along the axis I) and the coded bit bQ,p is the $p^{th}$ bit of the quadrature part of the signal (along the axis Q).

The complex symbol a (k) of the user of rank k is then spread by a spreading code specific to the spread circuit ETk of rank k. The spread symbols e(k) delivered by the different spread circuits are added in the adder 1. The signal delivered by the adder 1 is then transmitted to the serial-parallel conversion circuit 2 and the signals delivered in parallel by the circuit 2 are transmitted to the orthogonal frequency division multiplexing circuit 3. The circuit 3 operates an Inverse Fast Fourier Transform (IFFT).

In the present case, it is assumed that the MC-CDMA symbols obtained after the IFFT operation are separated by a guard space that is sufficiently long to eliminate the interference between symbols commonly known as ISI (standing for "Inter-symbol Interference"). To this end, the circuit 3 introduces a guard space (GS) in the form of a cyclical prefix between two consecutive symbols. The cyclical nature of the guard space advantageously allows a simplified representation of the propagation channel in the frequency domain. The use of a cyclical prefix is common and specific to multi-carrier systems with Orthogonal Frequency Division Multiplexing (or OFDM systems).

Figure 2:
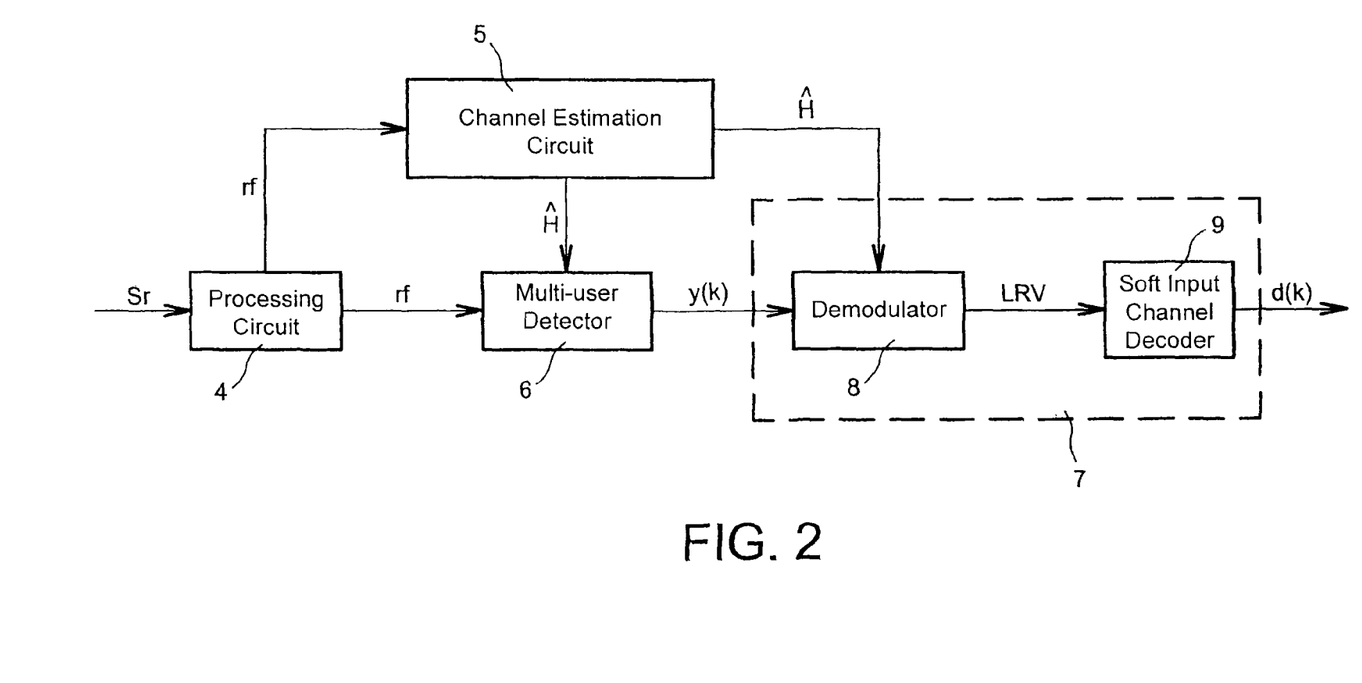
FIG. 2 shows an MC-CDMA receiver with equalisation and convolutional decoding according to the known art.

FIG. 2 shows a reception structure corresponding to the transmission structure in FIG. 1.

The reception structure includes a first processing circuit 4, a channel estimation circuit 5, a single or multi-user detector 6 and a decoding unit 7 constituted by a demodulator 8 implementing a soft demapping operation and by a soft input channel decoder 9.

The processing circuit 4 eliminates the cyclical prefix in the received signal Sr and performs a Fast Fourier Transform (FFT) on the signal Sr. The frequency signal rf delivered by the processing circuit 4 is used to implement channel estimation for each sub-carrier using the channel estimation circuit 5. The estimated values Ĥ delivered by the channel estimation circuit 5 are then used, in conjunction with the spreading codes, to implement a linear detection of the symbols received, also known as linear equalisation, in the detector 6.

The signal rf delivered by the processing circuit 4 is written:

$$rf=HC\sqrt{P}a+n \quad (1), \text{where}$$

n is a noise vector of dimension N×l containing the complex gaussian noise samples of variance $\sigma^2$, N being the number of sub-carriers contained in the signal rf, H is a diagonal matrix of dimension N×N representing the channel, the diagonal coefficient for the $i^{th}$ sub-carrier being written:

$$H(i)=h(e^{j2\pi i/N}) \qquad (2),$$

P is a diagonal matrix of dimension K×K containing the powers applied to each of the K spreading codes, a is the vector of transmitted symbols of dimension N×l, and C is the matrix of spreading codes of dimension N×K.

In the case, for example, of a single user detection, a linear detection followed by a despreading by the code $C_k$ of the user k is applied to the signal rf so as to supply the complex-valued symbol y(k) equating to the transmitted complex symbol a(k) for the user k. This gives:

$$y(k)=c_k^H g_k^H rf \qquad (3),$$

where $c_k$ and $g_k$ are, respectively, the column vector of rank k (for the user of rank k) of the spreading code matrix C and the equalisation matrix of the user of rank k, the exponent H representing the Hermitian operation.

The purpose of the single or multi-user detector or equaliser 6 is to reshape the received signal so that it corresponds as far as possible to the points of a reference constellation complying with the initial constellation. In the presence of noise (thermal noise and/or multiple access noise), the points relocated do not coincide with the reference constellation. This is why a soft quadrature demapping I/Q is performed after the signal is equalised and before it is decoded.

The decoding operation consists in relocating the binary values transmitted d(k) from the complex symbols y(k) produced by the linear detector. The demodulator 8 implements a soft demapping operation and delivers soft LogLR values to the soft input decoder 9. In this way, if a 16-QAM modulation on four bits is used, I/Q soft demapping consists in calculating four soft values corresponding to the four bits of the 16-QAM modulation.

The Logarithm of the Likelihood Ratio associated with the bit bI,q is written:

$$LogLR(bI, q) = \ln \frac{\sum_{\lambda \in S_{I,q}^{(1)}} Pr[a(k) = \lambda \mid y(k)]}{\sum_{\lambda \in S_{I,q}^{(0)}} Pr[a(k) = \lambda \mid y(k)]} \qquad (4)$$

where $Pr[a(k)=\lambda/y(k)]$ is the probability of the transmitted symbol a(k) having the value $\lambda$ when a received symbol is y(k), $\lambda$ being a complex reference symbol of QAM constellation associated with the complex symbol transmitted a(k) As a non-restrictive example, the complex reference symbols $\lambda$ of the 4-QAM constellation are:

$\lambda_1=(1+i)$, $\lambda_2=(1-i)$, $\lambda_3=(-1+i)$, $\lambda_4=(-1-i)$.

Generally speaking, for a bit bI,q, a QAM constellation is divided into two complementary blocks of reference complex symbols $\lambda$, the block $s_{I,q}^{(0)}$ containing the symbols $\lambda$ having a '0' at the position (I,q) and the block $S_{I,q}^{(1)}$ containing the symbols $\lambda$ having a '1' at the position (I,q). A same partition exists for a bit bQ,p.

Figure 3:
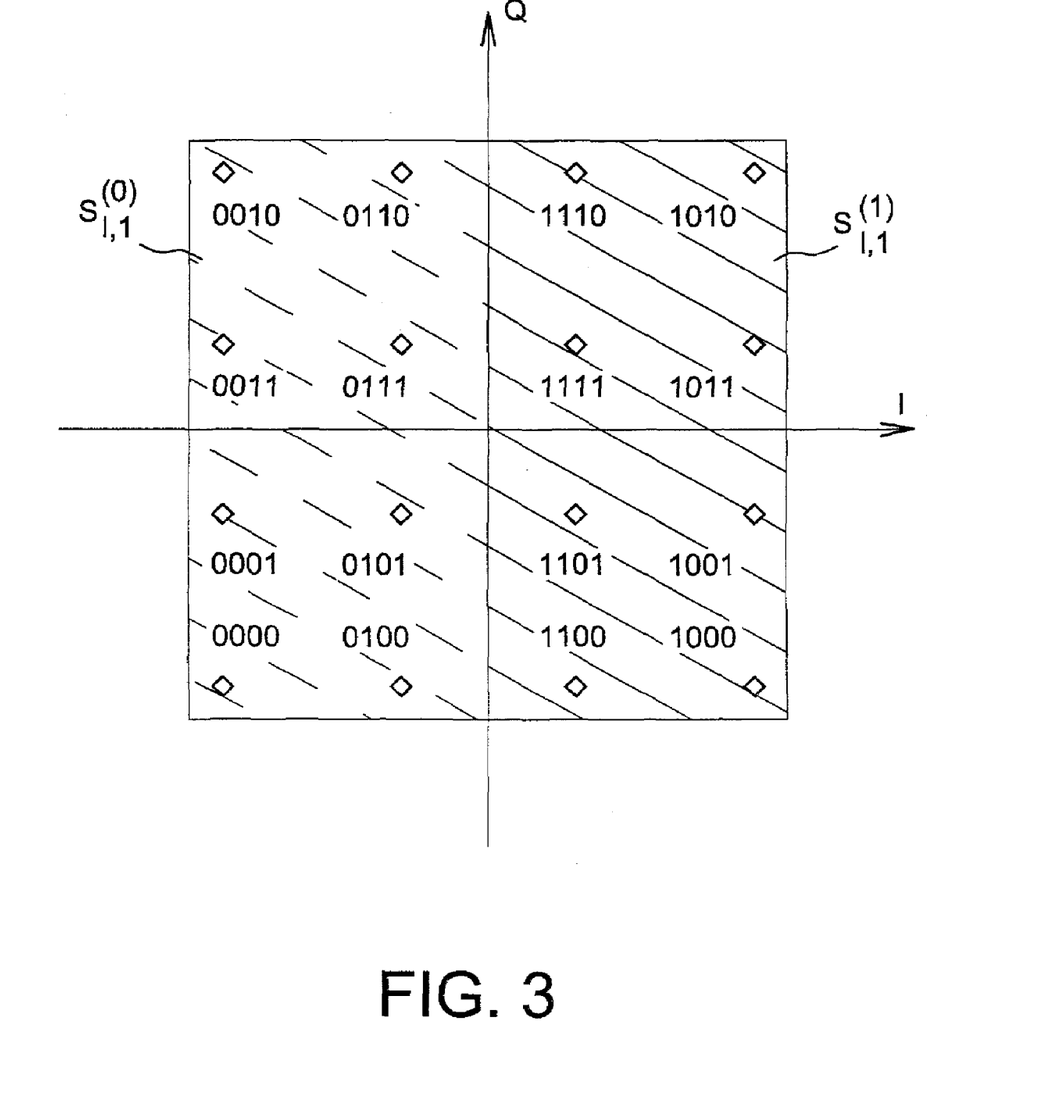
FIG. 3 shows, by way of example, the complementary partitions of the complex plane (I, Q) for the bit bI,1 in the case of a 16-QAM constellation.

FIG. 3 shows, by way of example, the partitions into complementary blocks of the complex plane (I, Q) in relation to the bit bI,1, in the case of a 16-QAM constellation. For a 16-QAM constellation, a complex symbol consists of four bits bI,1, bI,2, bQ,1, bQ,2. By definition, the bits bI,1, bI,2, bQ,1, bQ,2 have the respective positions (I,1), (I,2), (Q,1), (Q,2).

The two complementary partitions for the bits bI,1, bI,2, bQ,1, bQ,2 are then respectively:

$s_{I,1}^{(0)}$ and $s_{I,1}^{(1)}$,
$s_{I,2}^{(0)}$ and $s_{I,2}^{(1)}$,
$s_{Q,1}^{(0)}$ and $s_{Q,1}^{(1)}$,
$s_{Q,2}^{(0)}$ and $s_{I,2}^{(1)}$.

In FIG. 3, the partition $s_{I,1}^{(0)}$ is shown by the area in discontinuous lines and the partition $s_{I,1}^{(1)}$ shown by the area in continuous lines.

By applying the Bayes theorem and assuming that the symbols transmitted are distributed in an equiprobable way, the LogLR associated with the bit bI,q can then be expressed through the following equation:

$$LogLR(bI, q) = \ln \frac{\sum_{\lambda \in S_{I,q}^{(0)}} Pr[y(k) \mid a(k) = \lambda]}{\sum_{\lambda \in S_{I,q}^{(0)}} Pr[y(k) \mid a(k) = \lambda]} \qquad (5)$$

where $Pr[y(k)|a(k)=\lambda]$ is the probability of having received the symbol y(k) knowing that the transmitted symbol a(k) is equal to $\lambda$.

The numerator of the logarithm in the equation (5) above adds the probabilities for all the symbols having a '1' for the bit at the position (I,q) and the denominator adds the probabilities for all the symbols having a '0' at the position (I,q). These probabilities are decreasing exponential functions of the Euclidean distance between the received symbols and the reference symbols $\lambda$. The result is a soft value indicating the degree of confidence in respect of the bit bI,q, where a positive value indicates a '1' while a negative value indicates a '0'.

After the quadrature soft demapping operation, decoding is carried out implementing the dual operations performed by the coder at transmission. Bit deinterleaving, depunching and Viterbi decoding operations are then performed in order to relocate the binary data transmitted d(k).

Below is given the LogLR calculation commonly used in a prior art MC-CDMA system.

The $i^{th}$ complex data symbol received for the user k after a single user detection is expressed in the following form, if it is considered that the datum has been transmitted and spread over N sub-carriers (cf. bibliographical reference [1]):

$$y(k) = a(k)\sqrt{pk} \sum_{l=0}^{N-1} |c_{k,l}|^2 H_l g_{k,l} + \sum_{\substack{i=0 \\ i \neq k}}^{K-1} \sqrt{pi} \sum_{l=0}^{N-1} H_l g_{k,l} a_i c_{k,l}^* c_{i,l} + \sum_{l=0}^{N-1} g_{k,l} c_{k,l}^* n_l \qquad (6)$$

If Walsh Hadamard spreading codes are considered (real orthogonal codes taking the values $C_{k,l}=\pm 1$), we then obtain:

$$y(k) = a(k)\sqrt{p_k} \sum_{l=0}^{N-1} H_l g_{k,l} + \sum_{\substack{i=0 \\ i \neq k}}^{K-1} \sqrt{p_i} \sum_{l=0}^{N-1} H_l g_{k,l} a_i c_{i,l} c_{k,l} + \sum_{l=0}^{N-1} g_{k,l} c_{k,l} n_l \quad (7)$$

When a frequency interleaver is applied, the complex coefficients $H_l$ of the channel assigning the symbols a(k) may be considered as independent. In this way, for sufficiently long spreading codes ($N \geq 8$), the complex multiple access and noise interference terms may be approximated as additive complex gaussian noises (according to the central limit theorem) of nil mean and respective variances:

$$\sigma_{MAI}^2 \approx 2(K-1)(E[|g_{k,l}H_l|^2] - |E[H_l g_{k,l}]|^2) \quad (8)$$
$$\sigma_{NOISE}^2 \approx N\sigma^2 E[|g_{k,l}|^2]$$

i.e.:

$$\sigma_{MAI}^2 \approx 2\left(\sum_{\substack{i=0 \\ i \neq k}}^{K-1} Pi\right)(E[|g_{k,l}H_l|^2] - |E[H_l g_{k,l}]|^2) \quad (9)$$
$$\sigma_{NOISE}^2 \approx N\sigma^2 E[|g_{k,l}|^2]$$

The equations (8) correspond to the case where all the users have an identical power and the equations (9) correspond to the case where the power of the users differs from one user to the next.

The law of large numbers makes it possible to evaluate the mathematical expectations by replacing the expectations by the empirical mean of the terms considered. As a consequence, if $N \geq 8$, the variances for the noise and MAI terms can be formulated in the following way, on the one hand for identical powers:

$$\sigma_{MAI}^2 \approx 2(K-1)\left(\frac{1}{N}\sum_{l=0}^{N-1}|g_{k,l}H_l|^2 - \frac{1}{N^2}\left|\sum_{l=0}^{N-1}H_l g_{k,l}\right|^2\right) \quad (10)$$

$$\sigma_{NOISE}^2 \approx \sigma^2 \sum_{l=0}^{N-1}|g_{k,l}|^2$$

and, on the other hand, for different powers:

$$\sigma_{MAI}^2 \approx 2\left(\sum_{\substack{i=0 \\ i \neq k}}^{K-1} Pi\right)\left(\frac{1}{N}\sum_{l=0}^{N-1}|g_{k,l}H_l|^2 - \frac{1}{N^2}\left|\sum_{l=0}^{N-1}H_l g_{k,l}\right|^2\right) \quad (11)$$

$$\sigma_{NOISE}^2 \approx \sigma^2 \sum_{L=0}^{N-1}|g_{k,l}|^2$$

The LogLR to be used for the bit $bI,q$ at the decoder input in order to obtain a Viterbi decoding in the case of an M-QAM modulation is then written:

$$LogLR(bI, q) = \ln \frac{\sum_{\lambda \in S_{I,q}^{(1)}} \exp\left(-\frac{1}{2} \frac{\left|y(k) - \lambda\sqrt{p_k}\sum_{l=0}^{N-1}g_{k,l}H_l\right|^2}{\sigma_{BRUIT}^2 + \sigma_{IAM}^2}\right)}{\sum_{\lambda \in S_{I,q}^{(0)}} \exp\left(-\frac{1}{2} \frac{\left|y(k) - \lambda\sqrt{p_k}\sum_{l=0}^{N-1}g_{k,l}H_l\right|^2}{\sigma_{NOISE}^2 + \sigma_{MAI}^2}\right)} \quad (12)$$

The same relationship applies for quadrature channel bits Q.

From the equation (12), the exact formula can be obtained, for example, for a 4-QAM modulation generalised to the case of different powers:

$$LogLR(bI, q) = \frac{4\sqrt{p_k}\left|\sum_{l=0}^{N-1}g_{k,l}H_l\right|}{\sigma_{IAM}^2 + \sigma_{BRUIT}^2} y_I(k) \quad (13)$$

where $y_I(k)$ corresponds to the real part of the complex symbol received y(k) after equalisation. An identical relationship applies for the imaginary part along the axis Q.

For large spread factors, the calculation performed in the equation (13) may be simplified as follows:

$$LogLR(bI, q) \approx 4\frac{\sqrt{p_k}}{\sigma^2} y_I(k) \quad (14)$$

Indeed, for large spread factors, the weighting term $y_I(k)$ becomes almost constant and therefore has no effect on the soft input decoding process.

For short spread factors, the simplified expression (14) gives clearly less good results than the expression (13) because the central limit theorem is no longer verified. An approach giving similar performance to the one that uses the expression (13), even using a Minimum Mean Square Error (MMSE) single user equalisation, consists in weighting the symbol received in the following way:

$$LogLR(bI, q) \approx \frac{4\sqrt{p_k}}{\sigma^2} \frac{1}{N}\left(\sum_{l=0}^{N-1}|H_l|\right) y_I(k) \quad (15)$$

In practice, the equation (15) is preferable to the equation (13) when a single user MMSE equaliser is used, since calculation complexity is reduced with no significant loss of performance. However, it must be noted that the equation (15) gives clearly less good results than the equation (13) for "Maximum Ratio Combining" (MRC) and "Zero Forcing" (ZF) equalisers.

The prior art LogLR calculation methods described above are based on the assumption that the sub-carriers are independent. In fact, if frequency interleaving is not implemented at transmission or if, although implemented, the frequency interleaving does not sufficiently decorrelate the sub-carriers, the assumption of sub-carrier independence is no longer valid and the LogLR formulas given above are then no longer optimum. The Viterbi decoder then corrects fewer errors, which constitutes a drawback.

Prior art decoding methods require furthermore knowledge of the value of the spreading codes. This constitutes another drawback.

The invention does not have the drawbacks mentioned above.

DISCLOSURE OF THE INVENTION

Indeed the invention relates to a method for the soft demapping, by calculating a Logarithm of the Likelihood Ratio (LogLR), of complex-valued symbols (y(1), y(2), ..., y(k), ..., y(K)) corresponding to transmitted complex symbols (a(1), a(2), ..., a(k), ..., a(K)) contained in a signal transmitted by a code division multiple access multi-carrier transmitter and consisting of binary data coded by convolutional coding and quadrature modulated according to a M-QAM modulation, where M is an integer equal to $2^m$ and m is an integer greater than or equal to 1, a transmitted complex symbol a(k) of rank k (k=1, 2, ..., K) being spread by a spreading code associated with a user of rank k, the binary data coded by convolutional coding constituting, for the user of rank k, a sequence of bits {bI,1; bI,2; ...; bI,q; ...; bI,r; bQ,1; bQ,2; ...; bQ,p; ...; bQ,s}, wherein the bit bI,q is the $q^{th}$ coded bit of an in-phase part of the transmitted signal and the bit bQ,p is the $p^{th}$ coded bit of a quadrature part of the transmitted signal.

The Logarithm of the Likelihood Ratio (LogLR) of the bit bI,q and the Logarithm of the Likelihood Ratio (LogLR) of the bit bQ,p are written, respectively:

$$Log LR(bI, q) = \ln \frac{\sum_{\lambda \in S_{I,q}^{(1)}} \exp\left(-\frac{1}{2}\beta|\tilde{y}(k) - \lambda|^2\right)}{\sum_{\lambda \in S_{I,q}^{(0)}} \exp\left(-\frac{1}{2}\beta|\tilde{y}(k) - \lambda|^2\right)}$$

and $$Log LR(bQ, q) = \ln \frac{\sum_{\lambda \in S_{Q,q}^{(1)}} \exp\left(-\frac{1}{2}\beta|\tilde{y}(k) - \lambda|^2\right)}{\sum_{\lambda \in S_{Q,q}^{(0)}} \exp\left(-\frac{1}{2}\beta|\tilde{y}(k) - \lambda|^2\right)}$$

with:

$\beta = \eta^2/V$, where $\eta$ is a finite limit, when the total number K of spreading codes and the length N of the spreading codes tend towards infinity and when the quantity $\alpha$ ($\alpha=K/N$) is less than or equal to 1, of a random variable $\eta_k$ which weights the transmitted complex symbol a(k) such that:

$y(k) = \eta_k a(k) + \tau_k$, where y(k) is the complex-valued symbol of rank k which corresponds to the transmitted complex symbol a(k) and $\tau_k$ is a random variable representing a noise value produced from filtering multiple access noise and thermal noise, V is a finite limit of the variance of the random variable $\tau_k$, $\tilde{y}(k)$ is a standardised complex-valued symbol such that $\tilde{y}(k) = y(k)/\eta$, $\lambda$ is a reference complex symbol of QAM constellation associated with the M-QAM modulation, $S^{(1)}I,q$ is a partition of the complex plane which brings together all the reference complex symbols that have a "1" at the position (I, q), $S^{(0)}I,q$ is a partition of the complex plane which brings together all the reference complex symbols that have a "0" at the position (I, q), $S^{(1)}Q,p$ is a partition of the complex plane which brings together all the reference complex symbols that have a "1" at the position (Q, p), $S^{(0)}Q,p$ is a partition of the complex plane which brings together all the reference complex symbols that have a "0" at the position (Q, p).

According to an additional characteristic of the invention, in the case of a square M-QAM modulation for which $M = 2^{2a}$, where a is an integer greater than or equal to 1, the Logarithm of the Likelihood Ratio (LogLR) of the bit bI,q and the Logarithm of the Likelihood Ratio (LogLR) of the bit bQ,p are written (for a=1) or approximate (for a>1) in accordance with the following formulas:

$Log LR(bI,q) = \beta \times M_{I,q}$, with $M_{I,q} = \tilde{y}_I(k)$ for $q=1$, and $M_{I,q} = -|M_{I,q-1}| + m_{I,q}$ for $q>1$, $\tilde{y}_I(k)$ being the in-phase component of the standardised complex-valued symbol $\tilde{y}(k)$ and $m_{I,q}$ being half the distance between the complex plane partitions $S^{(0)}I,q$ and $S^{(1)}I,q$ and $Log LR(bQ,p) = \beta \times M_{Q,p}$, with $M_{Q,p} = \tilde{y}_Q(k)$ for $p=1$, and $M_{Q,p} = -|M_{Q,p-1}| + m_{Q,p}$ for $p>1$, $\tilde{y}_Q(k)$ being the quadrature component of the standardised complex symbol $\tilde{y}(k)$ and $m_{Q,p}$ being half the distance between the complex plane partitions $S^{(0)}Q,p$ and $S^{(1)}Q,p$.

According to another additional characteristic of the invention, $\beta$ is written:

$$\beta = p_k \frac{\left(\int_0^1 |h(e^{2i\pi f})|^2 \, df\right)}{\alpha \overline{p} \left(\frac{\int_0^1 |h(e^{2i\pi f})|^4 \, df}{\int_0^1 |h(e^{2i\pi f})|^2 \, df} - \int_0^1 |h(e^{2i\pi f})|^2 \, df\right) + \sigma^2}$$

where:

$h(e^{2i\pi f})$ is a channel frequency response $\overline{p}$ is a mean power associated with all the K spreading codes $p_k$ is a power associated with the spreading code of the user of rank k $\sigma^2$ is a thermal noise variance.

According to yet another additional characteristic of the invention, $\beta$ is written:

$$\beta = \frac{p_k}{\sigma^2} \frac{\left(\int_0^1 \frac{|h(e^{2i\pi f})|^2}{|h(e^{2i\pi f})|^2 + \frac{\sigma^2}{\alpha \overline{p}}} \, df\right)}{\int_0^1 \frac{df}{|h(e^{j2\pi f})|^2 + \frac{\sigma^2}{\alpha \overline{p}}}}$$

where:

$h(e^{2i\pi f})$ is a channel frequency response, $\bar{p}$ is a mean power associated with all the K spreading codes used, $p_k$ is a power associated with the spreading code of the user of rank k $\sigma^2$ is a thermal noise variance.

According to yet another characteristic of the invention, $\beta$ is the solution to the equation below:

$$1 = \int_0^1 \frac{1}{\frac{\sigma^2}{|h(e^{j2\pi f})|^2} A(\alpha, p_k, \beta) + \alpha \cdot B(\alpha, p_k, \beta)} df$$

with:

$$A(\alpha, p_k, \beta) = (1-\alpha)\frac{\beta}{p_k} + \alpha \cdot \beta \cdot m(p_k, \beta)$$

$$B(\alpha, p_k, \beta) = 1 - p_k \cdot m(p_k, \beta)$$

$$m(p_k, \beta) = \int_{-\infty}^{+\infty} \frac{\mu_{power}(u)}{p_k + \beta \cdot u} du$$

where:

$\mu_{power}(u)$ is a power limit distribution relating to the different powers associated with the different spreading codes, when N and K tend towards infinity, $\alpha = K/N$ remaining constant, $h(e^{2i\pi f})$ is a channel frequency response, and $p_k$ is a power associated with the spreading code of the user of rank k.

According to yet another characteristic of the invention, the approximated Logarithm of the Likelihood Ratio of the bit bI,q and the approximated Logarithm of the Likelihood Ratio of the bit bQ,p are written, respectively:

Log $LR(bI,q) = (\eta/V)Z_{I,q}$, with $Z_{I,q} = y_I$ for q=1, and $Z_{I,q} = -|Z_{I,q-1}| + \eta \times m_{I,q}$ for $q > 1$, $y_I$ being the in-phase component of the complex-valued symbol $y(k)$ and $m_{I,q}$ being half the distance between the complex plane partitions $S^{(0)}I,q$ and $S^{(1)}I,q$, and Log $LR(bQ,p) = (\eta/V)Z_{Q,p}$, with $Z_{Q,p} = y_Q$ for p=1, and $Z_{Q,p} = -|Z_{Q,p-1}| + \eta \times m_{Q,p}$ for $p > 1$, $y_Q$ being the quadrature component of the complex-valued symbol $y(k)$ and $m_{Q,p}$ being half the distance between the complex plane partitions $S^{(0)}Q,p$ and $S^{(1)}Q,p$.

The invention also relates to a method for decoding complex-valued symbols $(y(1), y(2), \ldots, y(k), \ldots, y(K))$ including a stage of soft demapping by calculating a Logarithm of the Likelihood Ratio (LogLR) and a stage of decoding by a soft input decoding algorithm in order to calculate, from the Logarithm of the Likelihood Ratio (LogLR), a sequence of bits corresponding, bit by bit, to a sequence of bits coded by convolutional coding, characterised in that the soft demapping stage is implemented by a method according to the invention.

According to an additional characteristic of the decoding method of the invention, the soft input decoding algorithm is the soft input Viterbi algorithm.

According to yet another additional characteristic of the decoding method of the invention, the convolutional coding is convolutional turbo-coding and the soft input decoding algorithm is the soft input and soft output Viterbi algorithm which uses a criterion of maximum likelihood or the algorithm of a posteriori probability maximisation which uses an a posteriori maximum criterion.

The soft demapping method according to the invention calculates the optimum soft decisions to be provided at a soft input decoder input in the case where the sub-carriers are correlated and for orthogonal spreading codes whereof it is not necessary to know the value. The method advantageously applies to any type of M-QAM modulation.

BRIEF DESCRIPTION OF THE DRAWINGS

Other characteristics and advantages of the invention will emerge from reading a preferential embodiment given with reference to the appended figures among which.

DETAILED DESCRIPTION OF THE PREFERRED EMBODIMENTS

FIGS. 1 to 3 have been described previously. There is therefore no pint in returning thereto.

Figure 4:
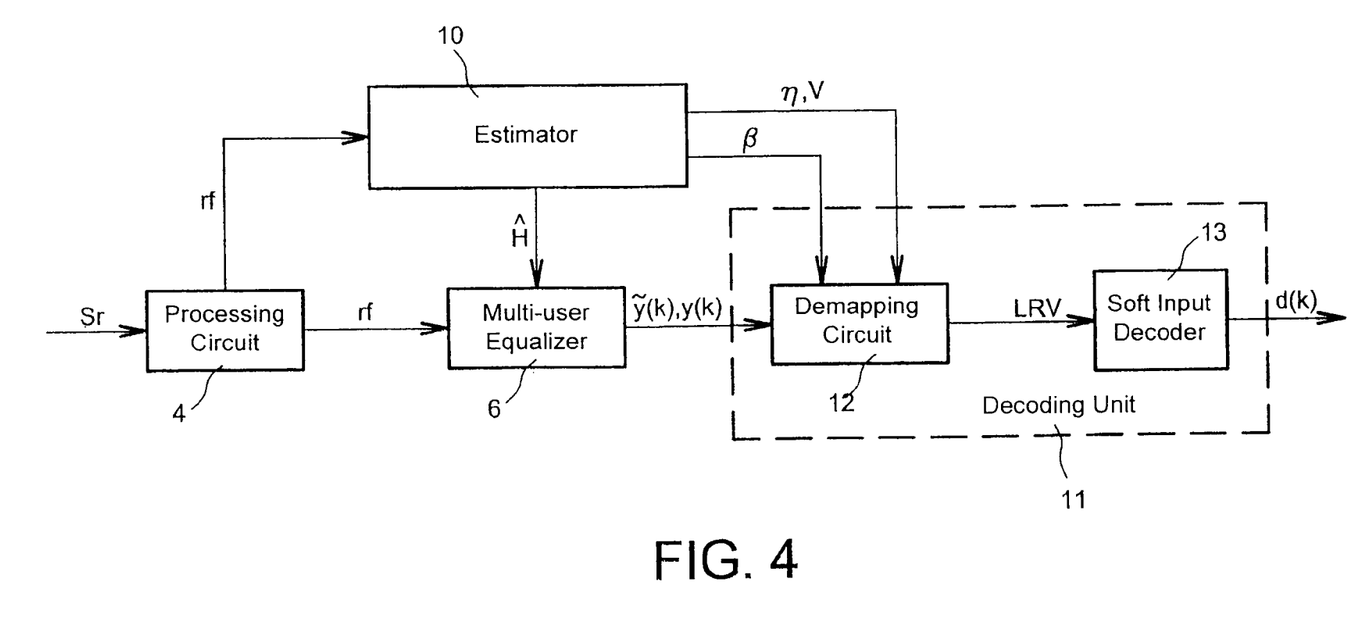
FIG. 4 shows a receiver with convolutional decoding according to the invention.

The receiver with convolutional decoding according to the invention shown in FIG. 4 includes a processing circuit 4, an equaliser 6, an estimator 10 and a decoding unit 11. The decoding unit 11 includes a soft demapping circuit 12 and a soft input decoder 13.

According to the invention the soft demapping circuit 12 calculates the LogLR for the bit bI,q according to the formula below:

$$\text{Log}LR(bI, q) = \ln \frac{\sum_{\lambda \in S_{I,q}^{(1)}} \exp\left(-\frac{1}{2}\beta|\tilde{y} - \lambda|^2\right)}{\sum_{\lambda \in S_{I,q}^{(0)}} \exp\left(-\frac{1}{2}\beta|\tilde{y} - \lambda|^2\right)} \quad (16)$$

where the coefficient $\beta$ is an asymptotic Signal-to-Interference-plus-Noise Ratio which is explained in detail in the remainder of the description. The LogLR for the bit bQ,p is given by a similar formula. The coefficient $\beta$ is delivered by the estimator 10.

At the output of a single or multi-user linear receiver for a MC-CDMA and DS-CDMA system, it is known that the complex-valued symbol $y(k)$ relating to the user of rank k may be written in the following way:

$$y(k) = \eta_k a(k) + \tau_k \quad (17)$$

where $\eta_k$ and $\tau_k$ are random variables which depend in a complex way on the channel matrices, the spreading codes and the code powers. The magnitude $\tau_k$ is the result of filtering the multiple access noises and the thermal noise. The variables $\eta_k$ and $\tau_k$ will now be explained below.

The random matrix theory applies to systems containing random variables such as spreading codes for DS-CDMA (Direct-Sequence Code Division Multiple Access) and MC-CDMA (Multi-Carrier Code Division Multiple Access) systems. When the dimensions of the system become large (number of codes, size of codes), the random matrix theory offers very powerful analysis tools. The main results of the asymptotic analysis are as follows (cf. bibliographical references [2] and [3]):

When N and K→∞ and α≦1 ((α=K/N) is fixed, $\eta_k$ converges towards a finite and deterministic limit η, When N and K→∞ and α is fixed, $\tau_k$ becomes gaussian and its variance converges towards a finite and deterministic limit V.

Given that $\eta_k$ converges and that $\tau_k$ has a gaussian behaviour, the equation (17) is then written:

$$y(k) = \eta a(k) + \tau_k \quad (18)$$

which represents a transmission through an Additive White Gaussian Noise (AWGN) channel.

To obtain these results, the code matrix is assumed to have a Haar distribution (cf. bibliographical reference [3]). This allows powerful results of the theory of free probabilities to be applied. Moreover the asymptotic limit is reached for practical values of the spread factor (N≧16).

When constellations are considered of order m strictly greater than 2 (M=$2^m$, with m>2) the decisions are no longer only made on the sign of the real and imaginary parts of the symbol produced by the equaliser. The symbols produced by the equaliser must then be standardised before the "soft demapping" operation is carried out. In the contrary case, the operation of comparing with the reference symbols is erroneous.

In the remainder of the description, the symbol obtained after standardisation at the output of the equaliser 6 will be denoted ỹ(k). This gives:

$$\tilde{y}(k) = a(k) + \frac{\tau_k}{\eta},$$

or else $$\tilde{y}(k) = y(k)/\eta$$

The prior art equation (12) brings out the estimation of the variance of the multiple access noise $\sigma_{IAM}^2$. This term is generally difficult to calculate since it depends on the spreading codes used, the channel matrix and the code powers. The known solution proposed in the literature consists in assuming the sub-carriers to be independent and in using real orthogonal spreading codes that have as many −1 as +1. The prior art LogLR calculation therefore proves complicated since it depends on the spreading codes.

On the basis of the equation (16), the demapping method according to the invention does not have these drawbacks. It is then possible, for example, to give the exact formula to be used for a 4-QAM modulation. If the real part of the received symbol after linear detection for the user k is denoted $y_I(k)$ and the real part of the received symbol after linear detection and standardisation is $\tilde{y}_I(k)$, this then gives the following relationship for the Logarithm of the Likelihood Ratio in relation to the bit bI,q:

$$\text{Log}LR(bI, q) = 4\frac{\eta^2}{V}\tilde{y}_I(k) \quad (19)$$

where $$\frac{\eta^2}{V}$$

where represents the Asymptotic SINR β delivered by the estimator 10.

An equation of the same type as the equation mentioned above may of course be applied for the imaginary part of the received symbol.

Particular different expressions of the LogLR, deduced from the equation (19), will now be calculated for different types of linear receivers 6, in the context, for example, of a 2-QAM (BPSK) or 4-QAM (QPSK) modulation.

a) Scenario for an MRC Receiver (MRC Standing for "Maximum Ratio Combining"):

An MRC receiver maximises the Signal-to-Noise Ratio (SNR) at the equaliser output in a single user context. An adapted filter applies a coefficient to each sub-carrier so as to maximise the energy received before the despreading operation is performed:

$$g_k = Hc_k,$$

with $y(k) = g_k^H rf$

This receiver is optimum in a single user context but offers poor performance in a multi-user (and therefore multi-code) context, since it is very sensitive to multiple access noise.

It has therefore been demonstrated (cf. bibliographical reference [4]) that for an MRC receiver the values of η and V in the case of a non-ergodic channel are as follows:

$$\eta = \sqrt{p_k} \int_0^1 |h(e^{2i\pi f})|^2 \, df \quad (20)$$

$$V = \alpha \bar{p} \left( \int_0^1 |h(e^{2i\pi f})|^4 \, df - \left( \int_0^1 |h(e^{2i\pi f})|^2 \, df \right)^2 \right) + \sigma^2 \int_0^1 |h(e^{2i\pi f})|^2 \, df \quad (21)$$

As a consequence the formula of the LogLR of the equation (19) becomes:

$$\text{Log}LR(bI, q) = 4 p_k \frac{\left( \int_0^1 |h(e^{2i\pi f})|^2 \, df \right) \tilde{y}_I}{\alpha \bar{p} \left( \frac{\int_0^1 |h(e^{2i\pi f})|^4 \, df}{\int_0^1 |h(e^{2i\pi f})|^2 \, df} - \int_0^1 |h(e^{2i\pi f})|^2 \, df \right) + \sigma^2} \quad (22)$$

This equation may also be written:

$$\text{Log}LR(bI, q) = \quad (23)$$

$$4 p_k \frac{\tilde{y}_I}{\alpha \bar{p} \left( \frac{\int_0^1 |h(e^{2i\pi f})|^4 \, df}{\left( \int_0^1 |h(e^{2i\pi f})|^2 \, df \right)^2} - 1 \right) + \frac{\sigma^2}{\left( \int_0^1 |h(e^{2i\pi f})|^2 \, df \right)}}$$

Additionally, if it is considered that the channel frequency response is flat on each sub-carrier, we then get:

$$\text{Log}LR(bl, q) = 4p_k \frac{\tilde{y}_l}{\alpha \overline{p} \left( \frac{N \sum_{l=1}^{N} |H_l|^4}{\left(\sum_{l=1}^{N} |H_l|^2\right)^2} - 1 \right) + \sigma^2 \frac{N}{\sum_{l=1}^{N} |H_l|^2}} \quad (24)$$

b) Sub-Optimum Minimum Mean Square Error (MMSE) Receiver:

This receiver minimises the mean square error between the transmitted signal and the received signal for each sub-carrier then despreads the resulting signal in order to estimate each symbol:

$$g_k = \left( HH^H + \frac{\sigma^2}{\alpha \overline{p}} \right)^{-1} Hc_k \quad (25)$$

This MMSE equalisation by sub-carrier technique is not optimum since it simply equalises the transmission channel without making allowance for the despreading process in calculating the equaliser. Nonetheless it does have the advantage of achieving a compromise between reducing the multiple access interference and raising the noise level.

In the document cited as bibliographical reference [5], it is shown that for the sub-optimum MMSE receiver, the terms $\eta$ and V are written in the case of a non-ergodic channel in the following form:

$$\eta = \int_0^1 \frac{|h(e^{2i\pi f})|^2}{|h(e^{2i\pi f})|^2 + \frac{\sigma^2}{\alpha \overline{p}}} df \quad (26)$$

$$V = \alpha \overline{p} \eta (1 - \eta)$$

Consequently the LogLR given in the equation (16) becomes:

$$\text{Log}LR(bl, q) = 4 \frac{p_k}{\sigma^2} \frac{\left( \int_0^1 \frac{|h(e^{2i\pi f})|^2}{|h(e^{2i\pi f})|^2 + \frac{\sigma^2}{\alpha \overline{p}}} df \right) \tilde{y}_l}{\int_0^1 \frac{df}{|h(e^{j2\pi f})|^2 + \frac{\sigma^2}{\alpha \overline{p}}}} \quad (27)$$

Additionally, if it is considered that the channel frequency response is flat on each sub-carrier, we get:

$$\text{Log}LR(bl, q) = 4 \frac{p_k}{\sigma^2} \frac{\left( \sum_{k=0}^{N-1} \frac{|H_k|^2}{|H_k|^2 + \frac{\sigma^2}{\alpha \overline{p}}} \right) \tilde{y}_l}{\sum_{k=0}^{N-1} \frac{1}{|H_k|^2 + \frac{\sigma^2}{\alpha \overline{p}}}} \quad (28)$$

Advantageously, it is noted that the formulation of the LogLR in the case of the single user MMSE receiver is more straightforward to implement that than of the prior art.

c) Optimum MMSE Receiver:

The coefficient g(k) of the equaliser is written here:

$$g(k) = \sqrt{p_k}(H.CPC^H H^H + \sigma^2 I)^{-1} h C_k \quad (29)$$

This type of receiver inverts the channel at the symbol level by making allowance for the spreading codes and the propagation channel. This technique is based on a priori knowledge of the spreading sequences and on the power of each of the active users.

The instant SINR for the user k at the optimum MMSE receiver output is then written (cf. [6]):

$$\text{SINR}_k = P_k c_k^H H^H (H.U_k Q_k U_k^H H^H + \sigma^2 I)^{-1} H c_k \quad (30)$$

where:

$U_k$ equates to the spreading code matrix C, from which is extracted the column vector $c_k$ corresponding to the code of the user of rank k, $Q_k$ equates to the power matrix P, from which is extracted the power $P_k$ of the user of rank k.

In the case of a non-ergodic channel, it is shown in [6] that the SINR converges towards its asymptotic value $\beta$ solution to the following implicit equation:

$$1 = \int_0^1 \frac{1}{\frac{\sigma^2}{|h(e^{j2\pi f})|^2} A(\alpha, p_k, \beta) + \alpha.B(\alpha, p_k, \beta)} df \quad (31)$$

with:

$$A(\alpha, p_k, \beta) = (1 - \alpha) \frac{\beta}{p_k} + \alpha \beta m(p_k, \beta)$$

$$B(\alpha, p_k, \beta) = 1 - p_k . m(p_k, \beta)$$

$$m(p_k, \beta) = \int_{-\infty}^{+\infty} \frac{\mu_{power}(u)}{p_k + \beta.u} du$$

and where $\mu_{power}(u)$ is the limit distribution of the power when N and K tend towards infinity and $\alpha$ ($\alpha$=K/N) remains constant. For example, if the system comprises $K_c$ power classes $p_1 \ldots, p_{Kc}$, then:

$$\mu_{power}(u) = \sum_{i=0}^{K_c-1} \gamma_i \delta(p - p_i) \quad (32)$$

where $\gamma_i$ is the ratio of codes belonging to the class i of power $p_i$ and $\delta(p-p_i)$ is the Dirac distribution in relation to the variable p.

The equation (31) shows that only the value of $\beta$ can be calculated, the value of $\sigma_{IAM}^2$ remaining inaccessible.

The exact formula of the Logarithm of the Likelihood Ratio can then be deduced therefrom namely:

$$\text{Log}LR(bl,q) = 4p_k \beta \tilde{y}_l \quad (33)$$

where $\beta$ is given from the equation (31).

The formulas given in scenarios a), b) and c) above are based on the equation (19) which equates to a QPSK modulation.

For square M-QAM modulations of an order strictly greater than or equal to 4 (M=$2^{2a}$, with a >1), the inventive method offers a simplified approach.

In the document cited as bibliographical reference [7], a simplification in respect of the LogLR calculation is described for the square M-QAM constellations of an order greater than or equal to 4 of coded OFDM systems (COFDM systems). This simplification leads to the Logarithm of the Likelihood Ratio for the bit bI,q being written in the form:

$$\text{Log } LR(bI,q) = |H|^2 M_{I,q} \text{ with}$$

H the channel frequency response, $$M_{I,q} = \tilde{y}_I(k) \text{ for } q=1, \text{ and}$$

$$M_{I,q} = -|M_{I,q}| + m_{I,q} \text{ for } q>1,$$

$\tilde{y}_I(k)$ being the in-phase component of the standardised complex-valued symbol and $m_{I,q}$ being half the distance between the complex plane partitions $S^{(0)}I,q$ and $S^{(1)}I,q$.

Surprisingly, in the context of the invention, it has been noted that the formulas of the Logarithm of the Likelihood Ratio for demapping complex-valued symbols corresponding to the quadrature modulated transmitted complex symbols according to a square M-QAM modulation of an order greater than or equal to 4, could be approximated as follows:

$$\text{Log } LR(bI,q) = \beta \times M_{I,q}, \text{ with}$$

$$M_{I,q} = \tilde{y}_I(k) \text{ for } q=1, \text{ and}$$

$$M_{I,q} = -|M_{I,q-1}| + m_{I,q} \text{ for } q>1,$$

$\tilde{y}_I(k)$ being the in-phase component of the standardised complex-valued symbol $\tilde{y}(k)$ and $m_{I,q}$ being half the distance between the complex plane partitions $S^{(0)}I,q$ and $S^{(1)}I,q$ and $$\text{Log } LR(bQ,p) = \beta \times M_{Q,p}, \text{ with}$$

$$M_{Q,p} = \tilde{y}_Q(k) \text{ for } p=1, \text{ and}$$

$$M_{Q,p} = -|M_{Q,p-1}| + m_{Q,p} \text{ for } p>1,$$

$\tilde{y}_Q(k)$ being the quadrature component of the standardised complex symbol $\tilde{y}(k)$ and $m_{Q,p}$ being half the distance between the complex plane partitions $S^{(0)}Q,p$ and $S^{(1)}Q,p$, the coefficient β being given, depending on the scenario involved, by any one of the formulas mentioned above.

This approximation in the formulas of the LogLRs constitutes a simplification in the implementation of the invention. Advantageously, this simplification authorises the use, at the equaliser output, of the non-standardised variable y (y=η$\tilde{y}$) and not of the standardised variable $\tilde{y}$. Advantageously, it is not then necessary to divide the signal delivered by the equaliser by η, which achieves a material simplification, a division being always more costly to implement than a multiplication.

This then gives:

$$\text{Log } LR(bI,q) = (\eta/V) Z_{I,q}, \text{ with}$$

$$Z_{I,q} = y_I \text{ for } q=1, \text{ and}$$

$$Z_{I,q} = -|Z_{I,q-1}| + \eta \times m_{I,q} \text{ for } q>1,$$

$y_I$ being the in-phase component of the complex-valued symbol y(k) and $m_{I,q}$ being half the distance between the complex plane partitions $S^{(0)}I,q$ and $S^{(1)}I,q$, and $$\text{Log } LR(bQ,p) = (\eta/V) Z_{Q,p}, \text{ with}$$

$$Z_{Q,p} = y_Q \text{ for } p=1, \text{ and}$$

$$Z_{Q,p} = -|Z_{Q,p-1}| + \eta \times m_{Q,p} \text{ for } p>1,$$

$y_Q$ being the quadrature component of the complex-valued symbol y(k) and $m_{Q,p}$ being half the distance between the complex plane partitions $S^{(0)}Q,p$ and $S^{(1)}Q,p$. The magnitudes η and V are delivered by the estimator 10.

BIBLIOGRAPHICAL REFERENCES

[1] *"OFDM Code Division Multiplexing in Fading Channels"* (Stefan Kaiser), IEEE Transactions On Communication, vol.50, No. 8, August 2002.

[2] *"Asymptotic distribution of large random matrices and performance of large CDMA systems"* (P. Loubaton), Proceedings, Seventh ISSPA Conf., Volume 2, Jul. 1-4, 2003, pages 205-214.

[3] *"Linear Precoders for OFDM Wireless Communications"* (M. Debbah), PhD Thesis, University of Marne la Vallée, October 2002.

[4] *"Simple polynomial MMSE Receivers for CDMA Transmission on frequency Selective Channels"* (W. Hachem), presented at the conference IEEE Transactions on Information Theory, July 2002, published on the internet site at "http://www.supelec.fr/ecole/radio/hachem.html".

[5] *"Asymptotic Analysis of Optimum and SubOptimum CDMA Downlink MMSE Receivers"* (J. M. Chaufray, W. Hachem, and Ph. Loubaton) presented at the ISIT'2002 conference at Lausanne, published on the internet site at http://syscom.univ-mlv.fr/loubaton/index.html.

[6] *"Asymptotical Analysis of the Multiuser MMSE Receiver for the downlink of a MC-CDMA system"* (P. Jallon, M. des Noés, D. Kténas and J. M Brossier), VTC Spring 2003, Jeju, Korea.

[7] *"Simplified Soft-Output Demapper for Binary Interleaved COFDM with Application to HIPERLAN/2"* (F. Tosato, P. Bisaglia), IEEE International Conference on Communications 1CC 2002, pp. 664-668, vol.2.

The invention claimed is:

1. A method comprising:
soft demapping, by Logarithm of the Likelihood Ratio calculation of complex-valued symbols (y(1), y(2), ..., y(k), ..., y(K)) corresponding to respective transmitted complex symbols (a(1), a(2), ..., a(k), ..., a(K)) contained in a signal transmitted by code division multiple access multi-carrier transmitter and constituted by binary data coded by convolutional coding and quadrature-modulated according to an M-QAM modulation, M being an integer equal to $2^{2a}$ and a being an integer greater than or equal to 2, a complex symbol transmitted a(k) of rank k, (k=1, 2, ..., K) being spread by a spreading code associated with a user of rank k, the binary data coded by convolutional coding constituting for the user of rank k, a sequence of bits {bI,1, bI,2, ..., bI,q, ..., bI,r, bQ,1, bQ,2, ..., bQ,p, ..., bQ,s}, wherein the bit bI,q is the $q^{th}$ coded bit of an in-phase part of the transmitted signal and the bit bQ,p is the $p^{th}$ coded bit of a quadrature part of the transmitted signal, wherein the soft demapping includes
obtaining a calculation of a Logarithm of Likelihood Ratio LogLR(bI,q) of the bit bI,q and a calculation of a Logarithm of Likelihood Ratio LogLR(bQ,p) of the bit bQ,p so that $$\text{Log}LR(bI, q) = (\eta/V) Z_{I,q}, \text{ with}$$

$$\eta = \sqrt{p_k} \int_0^1 |h(e^{2i\pi f})|^2 df, \text{ and}$$

$$V = \alpha \overline{p} \left( \int_0^1 |h(e^{2i\pi f})|^4 df - \left( \int_0^1 |h(e^{2i\pi f})|^2 df \right)^2 \right) + \sigma^2 \int_0^1 |h(e^{2i\pi f})|^2 df$$

wherein $h(e^{2i\pi f})$ is a channel frequency response, $p_k$ is a power associated with the spreading code of the user of rank k, α is equal to the total number K of spreading codes divided by the length N of the spreading codes, $\bar{p}$ is a mean power associated with all the K spreading codes, $\sigma^2$ is a thermal noise variance, and $Z_{I,q} = y_I$ for q=1, wherein $y_I$ is the in-phase component of the complex-valued signal y(k), and $Z_{I,q} = -|Z_{I,q-1}| + \eta \times m_{I,q}$ for q>1, wherein $m_{I,q}$ is half the distance between the partitions of the complex plane $S^{(1)}I,q$ and $S^{(0)}I,q$ such that:

$S^{(1)}I,q$ is a partition of the complex plane which brings together all the reference complex symbols having a <<1>> at the position (I, q), and $S^{(0)}I,q$ is a partition of the complex plane which brings together all the reference complex symbols having a <<0>> at the position (I, q), and $\text{Log } LR(bQ,p) = (\eta/V) Z_{Q,p}$, with $Z_{Q,p} = y_Q$ for p=1, wherein $y_Q$ is the quadrature component of the complex-valued symbol y(k), and $Z_{Q,p} = -|Z_{Q,p-1}| + \eta \times m_{Q,p}$ for p>1, wherein $m_{Q,p}$ is half the distance between partitions of the complex plane $S^{(1)}Q,p$ and $S^{(0)}Q,p$ such that:

$S^{(1)}Q,p$ is a partition of the complex plane which brings together all the reference complex symbols having a <<1>> at the position (Q, p), and $S^{(0)}Q,p$ is a partition of the complex plane which brings together all the reference complex symbols having a <<0>> at the position (Q, p).

2. A method comprising:

soft demapping, by Logarithm of the Likelihood Ratio calculation of complex-valued symbols (y(1), y(2), ..., y(k), ..., y(K)) corresponding to respective transmitted complex symbols (a(1), a(2), ..., a(k), ..., a(K)) contained in a signal transmitted by code division multiple access multi-carrier transmitter and constituted by binary data coded by convolutional coding and quadrature-modulated according to an M-QAM modulation, M being an integer equal to $2^{2a}$ and a being an integer greater than or equal to 2, a complex symbol transmitted a(k) of rank k, (k=1, 2, ..., K) being spread by a spreading code associated with a user of rank k, the binary data coded by convolutional coding constituting for the user of rank k, a sequence of bits {bI,1, bI,2, ..., bI,q, ..., bI,r, bQ,1, bQ,2, ..., bQ,p, ..., bQ,s}, wherein the bit bI,q is the $q^{th}$ coded bit of an in-phase part of the transmitted signal and the bit bQ,p is the $p^{th}$ coded bit of a quadrature part of the transmitted signal, wherein the soft demapping includes obtaining a calculation of a Logarithm of the Likelihood Ratio LogLR(bI,q) of the bit bI,q and a calculation of a Logarithm of the Likelihood Ratio LogLR(bQ,p) of the bit bQ,p so that $$\text{Log} LR(bI, q) = (\eta/V) Z_{I,q}, \text{ with}$$

$$\eta = \sqrt{P_k} \int_0^1 \frac{|h(e^{2i\pi f})|^2}{|h(e^{2i\pi f})|^2 + \frac{\sigma^2}{\alpha \bar{p}}} df$$

$$V = \alpha \bar{p} \frac{\eta}{\sqrt{p_k}} \left(1 - \frac{\eta}{\sqrt{p_k}}\right)$$

wherein $h(e^{2i\pi f})$ is a channel frequency response,

α is equal to the total number K of spreading codes divided by the length N of the spreading codes, $\bar{p}$ is a mean power associated with the set of K spreading codes, $p_k$ is a power associated with spreading code of the user of rank k, $\sigma^2$ is a thermal noise variance, and $Z_{I,q} = y_I$ for q=1, wherein $y_I$ is the in-phase component of the complex-valued signal y(k), and $Z_{I,q} = |Z_{I,q-1}| + \eta \times m_{I,q}$ for q>1, wherein $m_{I,q}$ is half the distance between the partitions of the complex plane $S^{(1)}I,q$ and $S^{(0)}I,q$ such that:

$S^{(1)}I,q$ is a partition of the complex plane which brings together all the reference complex symbols having a <<1>> at the position (I, q), and $S^{(0)}I,q$ is a partition of the complex plane which brings together all the reference complex symbols having a <<0>> at the position (I, q), and $\text{Log } LR(bQ,p) = (\eta/V) Z_{Q,p}$, with $Z_{Q,p} = y_Q$ for p=1, wherein $y_Q$ is the quadrature component of the complex-valued symbol y(k), and $Z_{Q,p} = -|Z_{Q,p-1}| + \eta \times m_{Q,p}$ for p>1, wherein $m_{Q,p}$ is the half of the distance between partitions of the complex plane $S^{(1)}Q,p$ and $S^{(0)}Q,p$ such that:

$S^{(1)}Q,p$ is a partition of the complex plane which brings together all the reference complex symbols having a <<0>> at the position (Q, p), and $S^{(0)}Q,p$ is a partition of the complex plane which brings together all the reference complex symbols having a <<1>> at the position (Q, p).

* * * * *